United States Patent [19]  [11] 4,062,120
Lacagnina et al.  [45] Dec. 13, 1977

[54] DIGITAL ELECTRONIC MICROMETER

[75] Inventors: John M. Lacagnina, Henrietta; Ernest G. Weber, Fairport; David W. Rucinski, Rochester; Bruce R. Robinson, Penfield, all of N.Y.

[73] Assignee: Quality Measurement Systems, Inc., Rochester, N.Y.

[21] Appl. No.: 694,542

[22] Filed: June 10, 1976

[51] Int. Cl.$^2$ .............................................. G01B 3/18
[52] U.S. Cl. .................................................... 33/166
[58] Field of Search ............... 33/166, 143 L, 143 K, 33/143 M, 143 J, 125 C, 158, 164 R, 167

[56] References Cited

U.S. PATENT DOCUMENTS

| 3,060,584 | 10/1962 | Westfall | 33/166 |
| 3,142,121 | 7/1964 | Stefanov | 33/143 L |
| 3,453,752 | 7/1969 | Williams | 33/166 |

Primary Examiner—Richard E. Aegerter
Assistant Examiner—Willis Little
Attorney, Agent, or Firm—Stonebraker, Shepard & Stephens

[57] ABSTRACT

A digital electronic micrometer eliminates backlash and other error between a movable probe and a digital readout and arranges all the working components within a handle thermally insulated from the probe and the yoke. An optical scale is secured to the probe to move directly with the probe past an electro-optical reader arranged within the tool handle, and a manually operable retractor moves the probe away from the anvil against the bias of a spring. Electronic circuitry and digital display can also be arranged in the tool handle for indicating positions of the probe relative to the frame, and the circuitry includes manually actuatable hold circuitry for maintaining the display at an indication of a previous position of the probe after movement of the probe. This allows the tool to be moved to an orientation for observing a measurement previously taken when the tool was in a position obscuring the reading. The circuitry also preferably includes error detection circuitry responsive to change of state of a signal from the reader at more than a predetermined rate or to movement of the probe during actuation of the hold circuitry for energizing an error indicator.

17 Claims, 4 Drawing Figures

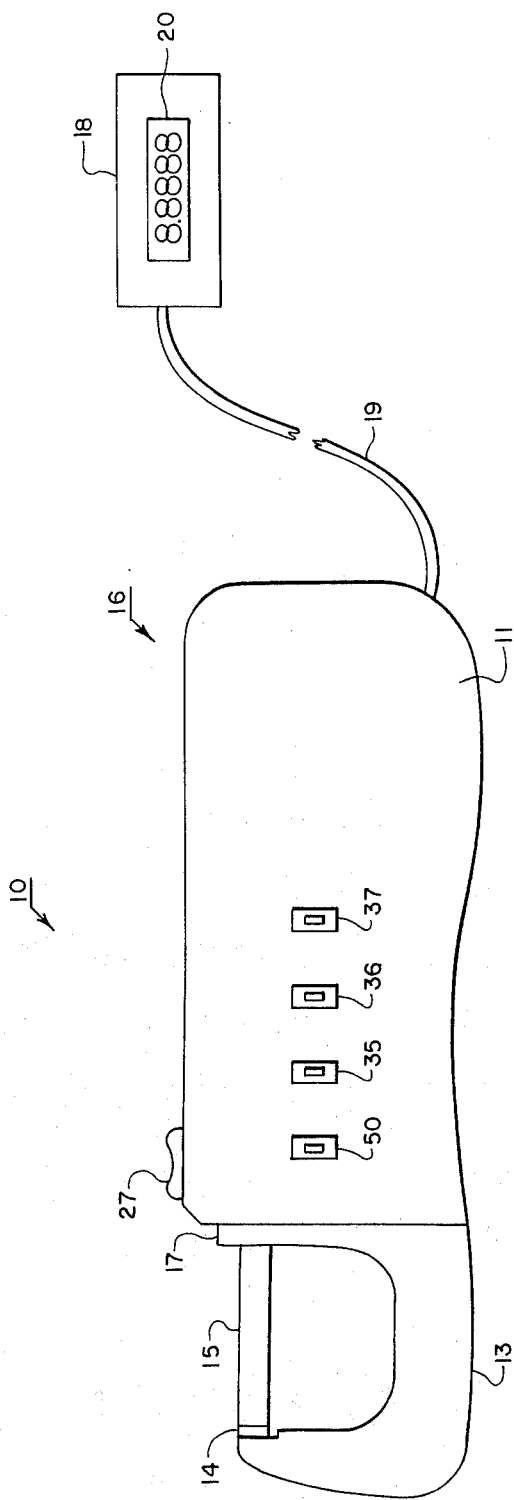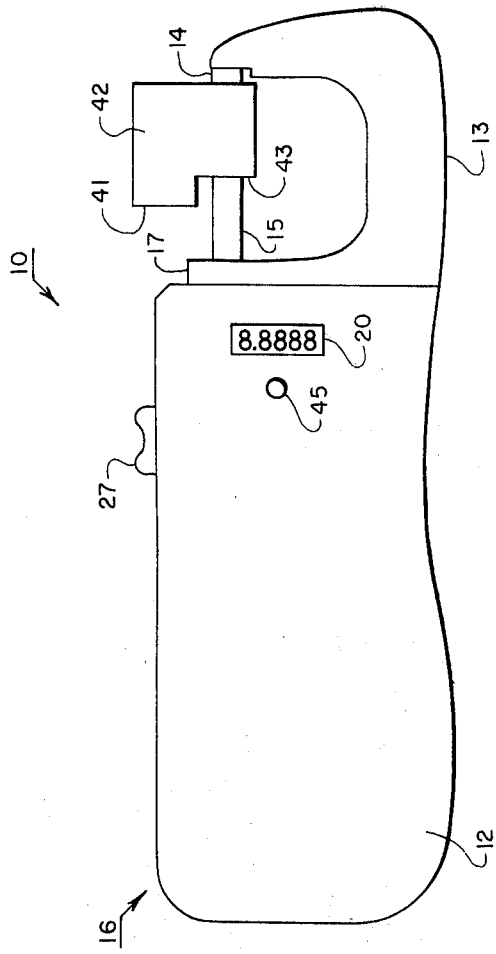

4,062,120

DIGITAL ELECTRONIC MICROMETER

BACKGROUND OF THE INVENTION

Digital electronic measuring devices are generally known, and there have been many suggestions for scales, readers, electronic logic circuitry and digital display devices for indicating the position of a mechanically movable probe for measurement purposes. There have also been a few suggestions for applying digital electronic measurement readout systems to handheld micrometers, but these have involved errors or deficiencies impairing the usefulness and accuracy of the instruments.

The invention involves a careful analysis of the state of the art of mechanical-optical-electronic systems for driving a digital display in response to probe movement and a realization of ways that components can be made compact enough to be included in a handheld micrometer. The invention also involves discovery of ways of mounting, orienting, and inter-relating various components to produce a handheld micrometer that is compact, portable, and inexpensive and yet highly accurate and reliable. The invention aims at substantial improvement in accuracy, efficiency, and convenience of operation in an electronic digital micrometer.

SUMMARY OF THE INVENTION

The inventive digital electronic micrometer has a frame including a yoke, an anvil, a bushing, and a probe supported by the bushing and movable relative to the anvil, with a spring biasing the probe toward the anvil. An optical scale is secured to the probe to extend in the direction of motion of the probe and move directly with the probe, and an electro-optical reader is fixed relative to the frame and arranged for detecting movement of the scale. A handle is secured to the frame and configured to be held in one hand for manually holding and operating the micrometer without touching the yoke, and the handle encloses the scale, spring, and reader. A retractor is secured to the probe and has a portion external of the handle and operable by the hand holding the handle for manually moving the probe away from the anvil against the bias of the spring.

Electronic circuitry and a digital display are cooperatively responsive to the reader for indicating positions of the probe relative to the frame, and the circuitry includes manually actuatable hold circuitry for maintaining the display at an indication of a previous position of the probe after movement of the probe from the previous position. The retractor is preferably formed of resin material with a flexible region between the probe and the external portion to limit stress on the probe from movement of the external portion of the retractor, and a beam is preferably mounted on the frame and arranged within the handle to extend parallel with the direction of motion of the probe and support the electro-optical reader and guide the movement of the retractor. The circuitry also preferably includes an error indicator and error detection circuitry responsive to change of state of a signal from a reader at more than a predetermined rate and responsive to movement of the probe from a previous position during actuation of the hold circuitry for energizing the error indicator.

DRAWINGS

FIG. 1 is a left side elevational view of one preferred embodiment of the inventive micrometer;

FIG. 2 is a right side elevational view of the micrometer of FIG. 1 shown in the process of measuring an object;

DETAILED DESCRIPTION

Figure 3:
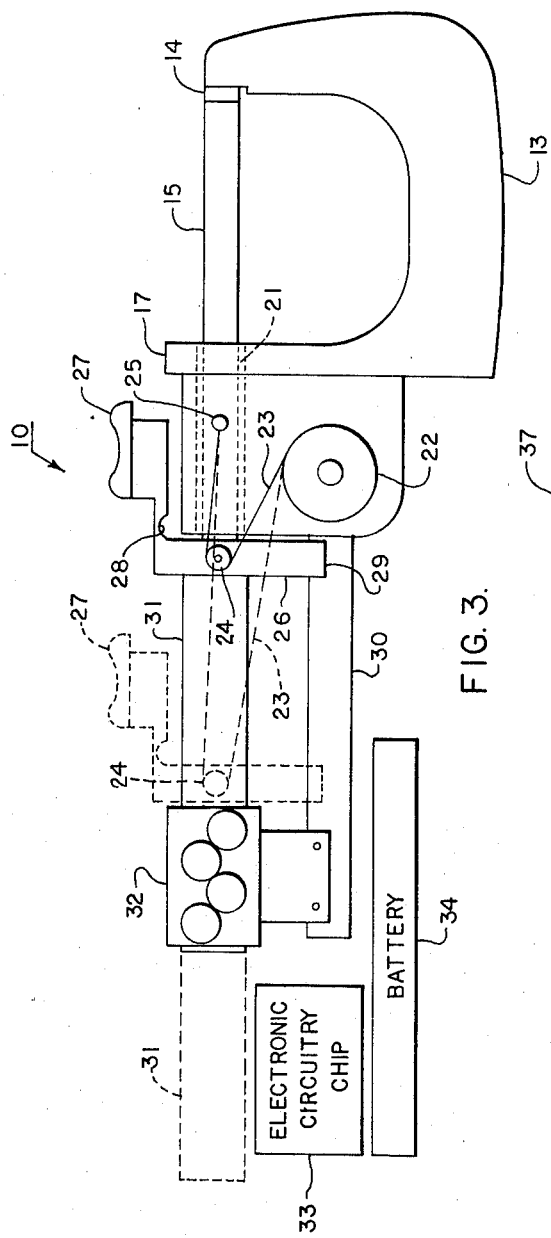
FIG. 3 is a partially schematic, right side elevational view of the micrometer of FIG. 2 with the handle cover removed.

Micrometer 10 is shown in two preferred forms in FIGS. 1 and 2, and each form includes a yoke 13, an anvil 14, and a probe 15 movable toward and away from anvil 14. The components of micrometer 10 are preferably mounted and supported relative to a frame 17, and many of the components are contained within a handle 16 and enclosed within handle cover parts 11 and 12. In the embodiment shown in FIG. 1, micrometer 10 is connected by an electric cord 19 with a remote display device 18 containing electronic logic and a digital display 20, and the embodiment of FIG. 2 contains the electronic logic within handle 16 and arranges digital display 20 in a window in handle cover part 12. The operation of the instruments of FIGS. 1 and 2 is essentially the same, except for the location of the electronic circuitry and digital display 20, so that the invention will be described relative to the self-contained embodiment of FIG. 2.

Handle 16 is preferably configured for comfortable gripping by a single hand that both holds and operates micrometer 10, and handle cover parts 11 and 12 are preferably formed of molded resin material for thermally insulating the operating hand from thermally sensitive parts of micrometer 10. Conventional micrometers with a rotatable spindle are usually held by a finger grip on the yoke, while a thumb and finger operate the spindle, even though contacting the instrument yoke with relatively high-temperature skin raises the yoke temperature and introduces error into the measurement. This can be observed by grasping yoke 13 and observing that the indication in display 20 of the position of probe 15 changes rapidly with change in the temperature of yoke 13. This source of error is avoided in micrometer 10 by providing handle 16 enclosing components within resin handle parts 11 and 12 that are thermally insulated from frame 17 and yoke 13 so that instrument 10 can be held and operated by the handle 16 without producing thermal error.

In addition to use as a micrometer, the same basic instrument 10 can be used as an indicator, merely by eliminating yoke 13 and anvil 14. The shape of handle 16 can also be changed if the instrument is used as an indicator, which is normally clamped in place, rather than hand held, and the comfortable grip configuration of handle 16 need not be used when instrument 10 is modified for use as an indicator.

Preferred working components for micrometer 10 are best shown in FIG. 3. A bushing 21 in frame 17 supports probe 15 for movement back and forth relative to bushing 21 and anvil 14. A preferably helical spring 22 is mounted on frame 17, and a tension cord 23 extends from spring 22 around a pulley 24 to an anchorage stake 25; and pulley 24 is movable back and forth with probe 15 so that spring 22 biases probe 15 toward anvil 14. The bias of spring 22 is preferably adjustable and preferably nearly constant throughout the travel of probe 15. This insures that probe 15 presses evenly and uniformly against an object being measured, regardless of the thickness of the object, and slight variations in the bias of spring 22 for different gaps between probe 15 and anvil 14 tend to be insignificant, especially when a succession of uniformly dimensioned parts are measured comparatively.

A retractor 26 is secured to probe 15 immediately back of frame 17 and bushing 21 when probe 15 rests against anvil 14, and retractor 26 can support pulley 24. Retractor 26 is preferably formed of molded resin material and includes an operating knob 27 that extends out through a slot between handle cover parts 11 and 12 to be gripped and moved by the thumb of the hand gripping handle 16. Retractor 26 also preferably has a flexible hinge region 28 between the region where retractor 26 is secured to probe 15 and the region of external slider knob 27. Flexible hinge region 28 then bends in response to movement of slider knob 27 and limits the application of stress to probe 15 and bushing 21 from pressure applied to knob 27. Also, movement of knob 27 toward probe 15 is limited by case portions 11 and 12 underlying the path of travel of slider knob 27. Such an arrangement allows slider knob 27 to be manually forced against its limit of travel without unduly stressing probe 15 or bushing 21 because of the limited motion of slider knob 27 and the flexing capacity of hinge region 28.

Retractor 26 also preferably has a bifurcated end region 29 straddling a fixed beam 30 secured to frame 17 and extending parallel with the direction of motion of probe 15. End region 29 of retractor 26 then slides along beam 30 between the solid- and broken-line positions of FIG. 3 to limit the rotational motion of probe 15 around the axis of probe 15.

An optical scale 31 is secured to probe 15 to extend in the direction of motion of probe 15 and to move directly back and forth with probe 15. Scale 31 is preferably formed of glass with optically accurate transverse lines formed in a generally known way. An electro-optical reader 32 is secured to beam 30 to be fixed in place relative to motion of scale 31. Reader 32 includes light sources and receivers on opposite sides of scale 31 and also has a separate scale of optical lines that form a relatively movable moire pattern as scale 31 moves relative to reader 32. The electrical output from reader 32 is a signal formed approximately as a succession of sine waves directly analogous to movement of scale 31 and probe 15, and this signal is processed in electronic circuitry preferably in the form of a microcircuit chip 33 powered by an energy source 34 for driving digital display 20. Reducing the electronic circuitry 33 to microcircuit form allows the complete circuitry to be mounted in handle 16 of instrument 10 along with energy source 34 and digital display 20, so that instrument 10 can be completely self contained, hand held, and portable for use in any location or orientation.

The optical phenomenon of moire fringe movement produced by lines on a pair of optical scales is generally understood in the measurement arts, and electronic circuitry for processing a signal derived from such moire effect to drive a digital display is also generally known. The arrangement of scale 31 relative to probe 15 and the mounting of reader 32 relative to scale 31 on beam 30 within the handle 16 of instrument 10 creates some important advantages for instrument 10 compared to other suggestions in the art, however. There is no possibility for lost motion from gear backlash or any other source between probe 15 and scale 31 because of their direct connection together. Also, mounting reader 32 on beam 30 parallel with the direction of motion of probe 15 and scale 31 eliminates possible error from any movement of reader 32. Reader 32 is also spring biased to bear directly against scale 31 so that movement of probe 15 necessarily moves scale 31 relative to reader 32 to eliminate any lost motion error.

Such an arrangement of components is also very stable, durable, reliable, and resistant to inaccuracies from shocks or bumps. Probe 15 moves axially without rotation and thus eliminates the need for highly accurate lapping of the end of probe 15 to anvil 14 as is necessary in conventional micrometers. Lost motion and inaccuracy due to wear of parts that is necessarily inherent in conventional micrometers having a rotatable spindle is eliminated in the inventive micrometer where the orientation and arrangement of components takes advantage of the utmost in simplicity and reliability.

Several switches are preferred for operation of electronic functions of instrument 10, and these can be arranged in a variety of places, as can digital display 20. For convenience of illustration only, handle 16 is shown in FIG. 1 as supporting an on/off switch 35, a hold switch 36, a reset or zero switch 37, and a switch 50 for setting the readout to English or metric. These switches are preferably arranged in openings in handle cover parts 11 or 12 in convenient positions for operation by a thumb or fingers of the hand gripping handle 16. Also, energy source 34 and microcircuit chip 33 can be arranged in any available space within handle 16.

Figure 4:
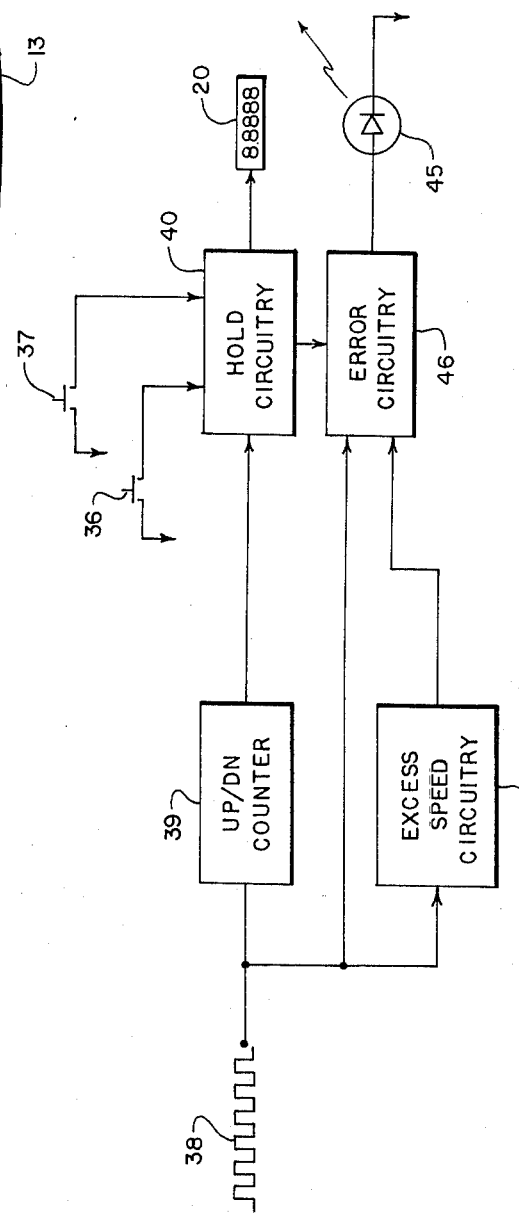
FIG. 4 is a partially schematic diagram of circuitry preferred for the inventive micrometer.

FIG. 4 schematically shows preferred electronic functions for instrument 10, but does not illustrate in detail the known expedients for processing a signal from an electro-optical reader and driving a digital display. The functions desired for instrument 10 are described below relative to the schematic diagram of FIG. 4, and those skilled in the art will appreciate the techniques and components required to implement the functions, once they are suggested by the invention.

An input signal 38, generally in the form of a sequence of square waves, is input to counter logic 39 having a capacity for counting both up and down to count the increments of movement of probe 15 and scale 31 in either direction. The output from counter 39 generally drives digital display 20, whose reading can be maintained by actuation of hold circuit logic 40 as manually controlled by hold and reset switches 36. When hold circuitry 40 is not operating, digital display 20 is directly driven by counter logic 39 in response to movement of probe 15 to secure a measurement. If the measurement must be taken with micrometer 10 in a position or orientation preventing the operator from viewing display 20 directly, then switch 36 is operated to maintain display 20 at the indication of the probe in the measuring position while the probe is moved in shifting the instrument from the orientation in which the measurement was taken to an orientation allowing the operator to read the meausrement indication held on display 20. Then hold switch 36 is released and zero switch 37 is actuated to reset the instrument for a future reading.

Zero or reset switch 37 is also manually operated at any time to reset counter 39 to a zero count at any desired position of probe 15. For example, instrument 10 can be zeroed by operating switch 37 when probe 15 is resting against anvil 14 or when probe 15 is resting at any desired distance from anvil 14, such as illustrated in FIG. 2. Zeroing instrument 10 with probe 15 in the position of FIG. 2 then allows probe 15 to be moved to surface 41 of block 42 for directly measuring the extent of the distance between surfaces 41 and 43. Zero switch 37 can be operated before any measurement to insure that instrument 10 is accurately zeroed at the operating temperature and ambient conditions for any desired position of probe 15.

Instrument 10 also preferably has an error indicator 45, preferably in the form of an LED arranged in any convenient location on handle 16, and preferably arranged near digital display 20. When indicator 45 is lit, it indicates that the reading of display 20 is inaccurate relative to the probe position, and electronic circuitry for energizing indicator 45 is preferably responsive to at least two possible sources of error. The incoming signal 38 is fed to error logic circuitry 46 along with an indication from hold circuit logic 47 that the hold circuitry is actuated, and if these two events occur simultaneously, error logic 46 energizes indicator 45 to indicate an error in display 20. This means in effect that if probe 15 is moved while hold circuitry 40 is actuated to maintain the indication of display 20, then the zero or reference position for probe 15 is lost, and this is indicated by error signal 45. The correction for this is simply to reset and rezero the instrument after actuation of the hold circuitry to prepare the instrument for another measurement.

Instead of an error indicator, memory circuitry could be used to store information about the movement of the probe while hold circuitry is operating, so that when the hold is released, the proper position of the probe is determined from memory circuitry without requiring the instrument to be reset. However, this requires substantial additional logic circuitry so that the relatively more simple error indication is preferred.

Error can also occur in the capacity of reader 32 to derive a meaningful signal from movement of scale 31, and this can be caused by dirt on the optical scales or by a jolt severe enough to misalign the optical scales. Errors from such defects are detected by excess speed logic 47 that responds to change of state of the input signal 38 faster than a predetermined threshold established at a rate slower than the operating capacity of counter 39. For example, counter 39 is typically driven by an oscillator and can readily have a capacity for counting changes of state of the input signal at up to 600kHz, and this rate is fast enough to keep up with free movement of probe 15 under the bias of spring 22, including any bounce back of probe 15 from anvil 14 or from an object being measured. Excess speed logic circuitry 47 is then adjusted to respond to changes of state of the input signal 38 of more than 500kHz as indicating such rapid movement for probe 15 as presumably erroneous. Such rapid movement could come from dropping the instrument or severely jolting or bumping it so that the movement of probe 15 is much faster than usual. Error signal 45 indicates this and warns the operator that the instrument must at least be rezeroed to achieve an accurate measurement. Dirt or flaws on the optical scales also produce fast and erratic signal changes that are detected by excess speed logic 47 and warn the operator of error in the indicated display. If the error cannot be eliminated by rezeroing the instrument, then it must be repaired, but the error cannot go undetected and cause further errors, because indicator 45 alerts the operator.

Those skilled in the art will appreciate the many ways that electronic circuits can be devised to accomplish the functions suggested by the invention, and also ways that the electronic circuitry can be miniaturized in microcircuit chips compact enough to be housed within instrument handle 16. Switch actuation and location and the location of digital display 20 can also be varied, as known to those skilled in the art, who will appreciate the many advantages in compactness, reliability, and accuracy from the inventive arrangement of components within a micrometer handle.

We claim:

1. A digital electronic micrometer having a frame including a yoke, an anvil on said yoke, and a bushing, a probe supported by said bushing and movable relative to said anvil, and a spring for biasing said probe toward said anvil, said micrometer comprising:
    a. a handle secured to said frame and configured to be held in one hand for manually holding and operating said micrometer without touching said yoke;
    b. said handle being hollow and enclosing parts of said micrometer;
    c. said handle being formed of a resin material for thermally insulating the heat of said hand holding said handle from said yoke and said frame;
    d. an optical scale secured to said probe to extend in the direction of motion of said probe and move directly with said probe within said handle;
    e. a reader assembly fixed relative to said direction of motion of said probe and arranged within said handle so that said scale is movable relative to said reader assembly and movement of said scale is electro-optically detected by said reader assembly;
    f. a retractor secured to said probe and having a portion external of said handle and operable by said hand holding said handle for manually moving said probe away from said anvil against the bias of said spring;
    g. electronic circuitry and a digital display cooperatively responsive to said reader assembly for indicating positions of said probe relative to said frame;
    h. said electronic circuitry including manually actuatable hold circuitry for maintaining said display at an indication of a previous position of said probe after movement of said probe from said previous position; and
    i. a switch arranged on said handle to be manually accessible by said hand holding said handle for actuating said hold circuitry.

2. The micrometer of claim 1 wherein said electronic circuitry and said digital display are arranged within said handle.

3. The micrometer of claim 1 wherein said external portion of said retractor is manually slidable along said handle in said direction of motion of said probe.

4. The micrometer of claim 3 wherein said retractor is formed of resin material and has a flexible region between said probe and said external portion to allow flexing of said external portion and to limit stress on said probe from movement of said external portion.

5. The micrometer of claim 1 wherein said spring is helical and arranged within said handle, a pulley is arranged within said handle to move with said probe and said scale, a tension strand extends from said spring around said pulley, and the free end of said tension strand is fixed relative to said frame.

6. The micrometer of claim 1 wherein a beam is mounted on said frame within said handle to extend parallel with said direction of motion of said probe, and said reader assembly is mounted on said beam.

7. The micrometer of claim 6 wherein said retractor has a portion straddling said beam for guiding said retractor along said beam.

8. The micrometer of claim 7 wherein said external portion of said retractor is manually slidable along said handle in said direction of motion of said probe and said retractor is formed of resin material and has a flexible region between said probe and said external portion to allow flexing of said external portion and to limit stress on said probe from movement of said external portion.

9. The micrometer of claim 6 wherein said spring is helical and arranged within said handle, a pulley is arranged within said handle to move with said probe and said scale, a tension strand extends from said spring around said pulley, and the free end of said tension strand is fixed relative to said frame.

10. The micrometer of claim 6 wherein said electronic circuitry and said digital display are arranged within said handle.

11. The micrometer of claim 1 including an error indicator and wherein said electronic circuitry includes error detection circuitry responsive to change of state of a signal from said reader at more than a predetermined rate for energizing said error indicator.

12. The micrometer of claim 11 wherein said error detection circuitry is also responsive to movement of said probe from said previous position during actuation of said hold circuitry for energizing said error indicator.

13. The micrometer of claim 12 wherein said electronic circuitry, said digital display, and said error indicator are arranged within said handle.

14. The micrometer of claim 12 wherein said external portion of said retractor is manually slidable along said handle in said direction of motion of said probe and said retractor is formed of resin material and has a flexible region between said probe and said external portion to allow flexing of said external portion and to limit stress on said probe from movement of said external portion.

15. The micrometer of claim 1 including an error indicator and wherein said electronic circuitry includes error detection circuitry responsive to movement of said probe from said previous position during actuation of said hold circuitry for energizing said error indicator.

16. The micrometer of claim 15 wherein said electronic circuitry, said digital display, and said error indicator are arranged within said handle.

17. The micrometer of claim 16 wherein said external portion of said retractor is manually slidable along said handle in said direction of motion of said probe and said retractor is formed of resin material and has a flexible region between said probe and said external portion to allow flexing of said external portion and to limit stress on said probe from movement of said external portion.

* * * * *